United States Patent

[11] 3,630,617

| [72] | Inventors | Harold L. Marrett<br>Irondequoit;<br>Roger R. A. Morton, Penfield, both of N.Y. |
|---|---|---|
| [21] | Appl. No. | 24 |
| [22] | Filed | Jan. 2, 1970 |
| [45] | Patented | Dec. 28, 1971 |
| [73] | Assignee | Bausch & Lomb Incorporated<br>Rochester, N.Y. |

[54] AUTOMATIC CALIBRATION OF AN OPTICAL MEASURING SYSTEM EMPLOYING A PHOTOMULTIPLIER OR LIKE DEVICE
7 Claims, 2 Drawing Figs.

[52] U.S. Cl.................................................. 356/72,
235/92, 250/207, 250/218, 356/102, 356/103, 356/208
[51] Int. Cl.......................................................G01n 21/00,
G01n 15/02, G01n 21/06

[50] Field of Search..........................................356/102–104,
208, 207, 72; 250/218, 207; 235/92

[56] References Cited
UNITED STATES PATENTS

| 2,412,423 | 12/1946 | Rajchman et al. | 250/207 |
| 2,605,430 | 7/1952 | Marcy | 250/207 |
| 3,392,331 | 7/1968 | Coulter | 235/92 (30) UX |
| 3,431,423 | 3/1969 | Keller | 250/218 |

Primary Examiner—William L. Sikes
Assistant Examiner—Warren A. Sklar
Attorneys—Frank C. Parker and Saul A. Seinberg ABSTRACT: Automatic calibration of an optical-measuring system employing a photomultiplier tube or like device is achieved by varying the gain of the system until its response to a known event exceeds a predetermined threshold level. At that point, the gain which coincides with the threshold crossover point is held, thereby calibrating the system for future measurement.

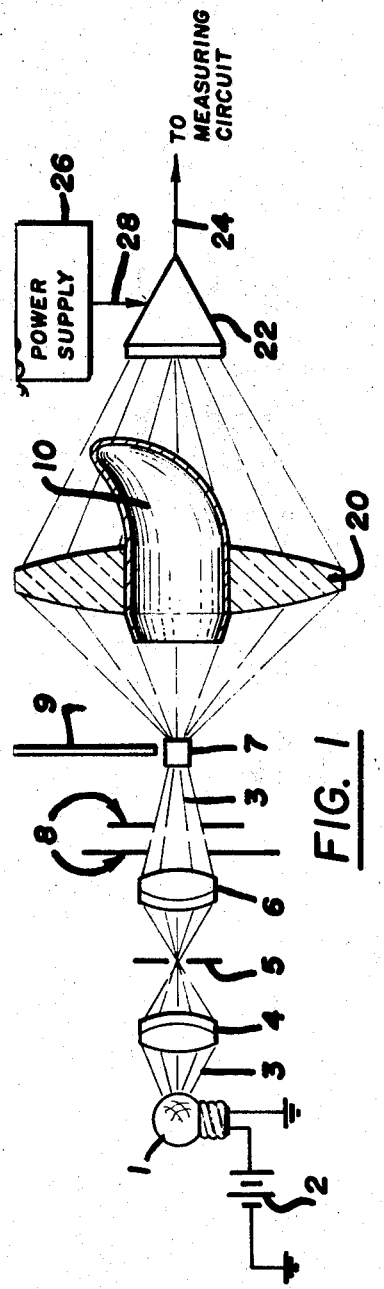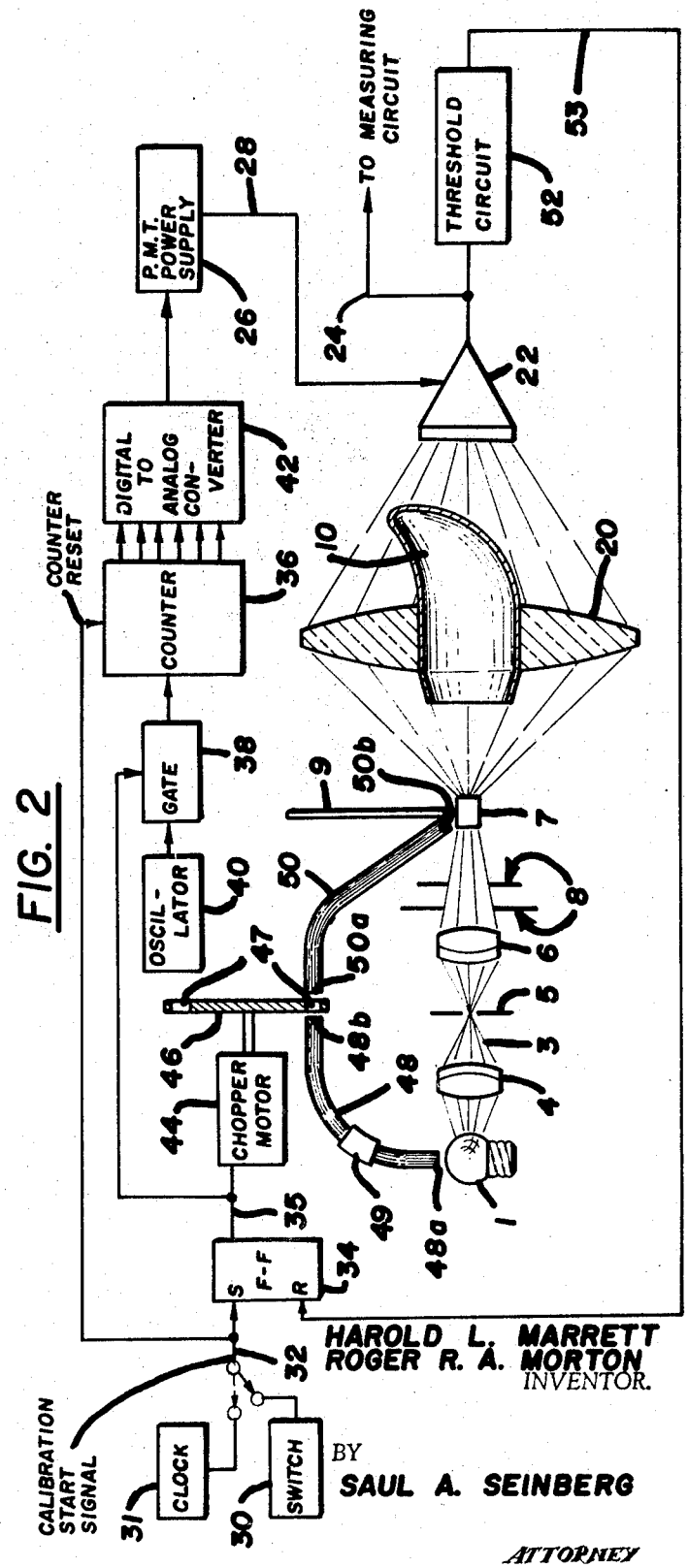

AUTOMATIC CALIBRATION OF AN OPTICAL MEASURING SYSTEM EMPLOYING A PHOTOMULTIPLIER OR LIKE DEVICE

BACKGROUND OF THE INVENTION

1. Field of the Invention

This invention relates to the field of optical measuring systems and particularly to automatic calibration of such systems which employ a photomultiplier tube or like device.

2. Description of the Prior Art

In the optical measuring system art, a variety of circuits for controlling the gain of a photomultiplier tube used as an element in such systems are known. Such circuits are employed to overcome the erratic operation of the photomultiplier tubes which, due to various inherent factors, results in output variations for a given level of input. One cause of this difficulty results from saturation of the final states of electron multiplication within the phototube itself. In addition, photomultiplier output fluctuations are caused by instabilities or changes in other system elements, such as variations in light source intensity brought about by aging of the lamp filament or blackening of the lamp surface, the influence of temperature, variations in the photomultiplier tube power supply, variations in the gain of the amplifier stages of the threshold circuit or dirt on the collimating lens or window area of the photomultiplier tube.

In many prior art devices, these variations or instabilities were controlled and compensated for by manual calibration. In devices of this nature, the operator pushed a calibration button which actuated a chopper motor causing light pulses to pass from a light source through appropriate optics to the view volume from whence the light pulses passed on to the photomultiplier tube. This arrangement permitted the passage of a fixed fraction of light from the light source to impinge upon the face of the photomultiplier tube. The calibrating system was designed so that these light pulses simulated a particle of fixed size. By keeping the calibration button depressed or operative, the operator continued the generation of light pulses as he adjusted the photomultiplier tube supply voltage so that the amplitude of the output pulse from the tube was just equal to the threshold level of the threshold circuit. When this condition was satisfied, the instrument was said to be calibrated. The disadvantage of this system was the requirement of periodic operator intervention to perform the calibration procedure. Since the instrument could otherwise be left unattended for long periods of time, manual calibration detracted from its efficient use.

Other optical measuring systems appeared which attempted automatic correction for certain of the the above-noted variations. Typical of these is the automatic gain control circuit disclosed by H. O. Marcy in U.S. Pat. No. 2,605,430 issued on July 29, 1952. This circuit was designed for the express purpose of preventing variations in the photomultiplier tube output due to some internal problem, such as saturation of the final stages of electron multiplication within the photomultiplier tube.

Still other systems appeared which automatically corrected for certain of the above-noted variations in addition to the internal one by controlling and stabilizing the gain of the photomultiplier tube. Typical of such circuits or systems is the one disclosed by J. A. Rajchman and E. A. Goldberg in U.S. Pat. No. 2,412,423 issued on Dec. 10, 1946. By holding the gain of the photomultiplier tube constant, the patentees circumvented erroneous readings caused by changes in tube characteristics and/or supply voltages. However, the disclosed circuitry is rather complex and expensive in that a number of additional elements are required.

In addition, the prior art circuits did not overcome the need for manual calibration nor were they intended to accomplish this. Thus, in spite of the partial elimination of errors due to inherent internal limitations of the photomultiplier tube and/or its associated power supply, it was still necessary to calibrate the optical measuring system with respect to the event being measured.

SUMMARY OF THE INVENTION

It is, therefore, a primary object of the present invention to provide an automatic calibration capability for an optical measuring system which employs a photomultiplier tube or like device.

It is an additional object of the present invention to provide a economical automatic calibration capability for an optical measuring system which employs a photomultiplier tube or like device.

It is a further object of the present invention to provide an automatic calibration capability for an optical measuring system which employs a photomultiplier tube whereby the system can be calibrated in terms of the quantity to be measured regardless of variations in the tube itself or in the system.

Accordingly, in an optical measuring system which employs a photomultiplier tube, there is provided an oscillator, a gate, a counter, a digital-to-analog converter and a small amount of control logic circuitry, in addition to the usual system elements. The calibration cycle is initiated by a start signal derived from a clock in the system or from a switch which is actuated by the operator. This signal resets the counter to zero and also reduces the photomultiplier tube supply through the digital-to-analog converter to its minimum voltage. The start signal also places a flip-flop in the logic circuitry in its "set" state which turns on a chopper motor ordinarily found in such optical measuring systems. A predetermined percentage of light emanating from the light source is directed at the view volume from whence it impinges on the photomultiplier tube. The photomultiplier output, which is continuously monitored by a threshold circuit, is not, at this point, high enough to cause the threshold circuit to turn on. Consequently, the oscillator output drives the counter higher which, in turn, increases the photomultiplier tube supply voltage and gain to a point at which the threshold circuit does turn on. At this point, the flip-flop is reset, the gate turned off, and the supply voltage held at that level which causes the photomultiplier tube output to equal the threshold value of the threshold circuit. Thus, the system has been automatically calibrated in terms of the percentage of light allowed to illuminate the view volume.

BRIEF DESCRIPTION OF THE DRAWINGS

FIG. 1 illustrates the internal arrangement of elements in a typical optical measuring system.

FIG. 2 illustrates the optical measuring system of FIG. 1 modified in accordance with the present invention to provide it with automatic calibration capability.

DESCRIPTION OF THE PREFERRED EMBODIMENT

Referring now to the drawings wherein like reference numerals have been employed where appropriate for like elements, FIG. 1 illustrates the internal arrangement of the elements of a typical optical measuring system, a forward scatter photometer. The illustrated system is explained in greater detail for those having need of such information in U.S. Pat. No. 3,431,423 granted to J. D. Keller on Mar. 4, 1969 and assigned to the same assignee as the present invention.

In FIG. 1, a source of illumination 1 is energized by a suitable source of electrical energy 2, here shown as a battery. The source of illumination radiates a beam of light 3 through condenser lens 4 to image on the slit 5. The slit 5 defines the maximum height of the beam 3 at this point. The slit 5 is relatively narrow and its width is limited to approximately its height. Relay lens 6 images the slit 5 on the view volume 7. The baffles 8 absorb any stray light from the optical elements. The height of the view volume 7 may be considered to be defined by the height of the image of slit 5 which has been imaged, in turn, at the view volume 7. The view volume 7 may also be considered to be partially defined by the area of the hollow flow tube 9 through which is passed an aerosol flow containing the particles or impurities to be measured. Accordingly, the view volume 7 is, for example, totally defined by the volume of a cylinder whose diameter equals the inner diameter of flow tube 9 and whose height equals the height of the image of slit 5.

If no particles or impurities were present in the aerosol flow passing through flow tube 9, the light beam 3 would be directed into the light trap 10. The light trap 10 is defined by a horn-shaped element having a black reflecting inner surface which produces continuous reflection and absorption to attenuate the light beam and thereby prevent any light from escaping.

If there are particles or impurities present in the aerosol flow, a portion of light beam 3 is scattered forward by these particles and is collected by collector lens 20. Those rays in the beam 3 which do not intercept particles are trapped by the light trap 10. The scattered rays are then focused on a photomultiplier tube 22 which produces an output signal on line 24 proportional to the quantity of light impinging thereupon. The gain of the photomultiplier tube 22 is dependent upon the voltage supplied by power supply 26 via line 28. An increase in the supply voltage will cause an increase in the output of the photomultiplier tube 22 for a given quantity of light incident thereupon, providing the tube 22 has not saturated, and vice versa. Finally, the output of the photomultiplier tube 22 is fed to a measuring circuit (not shown) where the desired particle information is extracted.

FIG. 2 illustrates how the optical-measuring device of FIG. 1 can be adapted, according to the present invention, to provide automatic calibration capability. A calibration start signal is used to initiate the calibration cycle. The start signal can be generated by the operator of the system by means of a switch 30 which would be conveniently located for this purpose. The switch 30 could also be employed to actuate the light source 1. If this were done, the light source filament would necessarily need to have a relatively short time constant. For purposes of the remainder of the discussion of the preferred embodiment it will be assumed that the light source has been actuated well in advance of the generation of a start signal. Alternatively, the start signal can be automatically and/or periodically generated by a clock 31 located internally in the optical measuring system. In either case, the start signal, when generated, appears on line 32. It "sets" flip-flop 34 so that its output is "up" and resets counter 36 to zero.

As shown in FIG. 2, the output of flip-flop 34 is connected by line 35 to gate 38. When flip-flop 34 is set by the start signal, gate 38, which is otherwise closed or "down," is opened to permit pulses generated by oscillator 40 to pass to the counter 36. Counter 36 is connected to the digital-to-analog converter 42 which is connected, in turn, to the photomultiplier tube power supply 26.

In the preferred embodiment, the photomultiplier tube power supply 26 is adjustable, its output being directly dependent upon the input it receives from the digital-to-analog converter 42. As is well known in the art, the converter 42 transforms the digital information it receives from the counter 36 to an analog signal which is then utilized by the photomultiplier tube power supply 26. The adjustability of the photomultiplier tube power supply 26 can be achieved in a number of ways all well known in the art. Some typical circuits can be found, for example, in *Electron-Tube Circuits* by S. Seely (1958), in *Transistors: Theory and Circuitry* by K. Dean (1965), or in *Design Manual for Transistors Circuits* (1961), all published by McGraw-Hill Book Co., Inc.

In addition to its above-noted interaction with gate 38, the flip-flop output also actuates chopper motor 44 to which is connected chopper 46 for rotation thereby. Chopper 46 has a number of spaced apertures 47 therein.

A fiber optic bundle 48 is positioned adjacent the light source 1. It transmits a predetermined percentage of the illumination emanating from the light source 1 to the chopper 46. The amount of light transmitted by the fiber optics 48 can be adjusted, in a well-known manner, by the light valve 49 should it be desireable to alter the predetermined percentage of illumination transmitted by the bundle 48. As is shown in FIG. 2, the output end 48b of the fiber optic bundle 48 is positioned in registration or alignment with the rotational path of the chopper apertures 47 on one side of the chopper 46. When the chopper 46 is rotated, illumination exiting the output end 48b of the fiber optics 48 is modulated thereby. A second fiber optic bundle 50 is positioned with its input end 50a adjacent the other side of the chopper 46 in alignment with the output end 48b of the fiber optic bundle 48 and the rotational path of the chopper apertures 47. The ends, 48b and 50a respectively, of the fiber optic bundles 48 and 50 are positioned closely adjacent to the chopper 46 to minimize illumination losses.

The output end 50b of the fiber optic bundle 50 is positioned adjacent the view volume 7 at an appropriate angle to the axis of the main beam 3 of illumination transmitted through the optical-measuring system. As previously explained, the main beam 3 will pass through the view volume 7 and be gathered completely by the light trap 10, since there are no particles or impurities present in the view volume during the calibration cycle. The only illumination, therefore, which will be incident upon collector lens 20 will be the predetermined percentage of light transmitted by the fiber optic bundles 48 and 50. It will be appreciated that the quantity of light incident upon the view volume 7 which has been transmitted by the fiber optic bundles 48 and 50 simulates a particle of known size.

Photomultiplier tube 22 receives this quantity of light and produces an output signal in response thereto. The output signal generated as a result of illumination impinging upon the photomultiplier tube 22 is fed to a measuring circuit (not shown) and the threshold circuit 52. As shown in FIG. 2, the output of the threshold circuit is connected via line 53 to the reset terminal of flip-flop 34. It will be appreciated by those having skill in the art, that the threshold circuit 52 will exhibit an output, if and only if, its input, as generated by the photomultiplier tube 22, exceeds a predetermined level termed the threshold value.

The operation of the system illustrated in FIG. 2 is as follows. The generation of the start signal will activate the light source 1, if it has not already been turned on. At the same time, flip-flop 34 is set thereby opening gate 38. Pulses generated by oscillator 40 are now free to pass through gate 38 to counter 36 which has been reset to zero by the start signal. Simultaneously, the counter 36 output is reduced thereby lowering the input to the digital-to-analog converter 42. This results in diminishing the output of the photomultiplier tube power supply 26 to its lowest level which reduces the gain of the photomultiplier tube 22 correspondingly. At these reduced levels, the output of the photomultiplier tube 22, for a given quantity of light incident thereupon, is chosen to be below the threshold value of threshold circuit 52.

The photomultiplier tube 22, in response to the predetermined quantity of illumination now impinging upon its face, generates an output signal which is relatively low because of its reduced level of supply. As stated, the output signal of the photomultiplier tube 22 is, at this point, below the threshold value of the threshold circuit 52. Consequently, there is no output forthcoming from the threshold circuit 52 and the flip-flop 34 remains set.

The output value of the photomultiplier tube power supply 26 after it has been initially reduced to its minimum level is now controlled by the output of the digital-to-analog converter 42. The output level of the converter 42, in response to the continuing accumulation of pulses by the counter 36, rises thereby increasing the supply voltage to the photomultiplier tube 22. The increasing supply voltage increases the gain of the photomultiplier tube 22 and, therefore, its output signal until it reaches the threshold value of the threshold circuit 52. At this point, the threshold circuit generates an output signal which resets flip-flop 34 resulting in gate 38 being cut off thereby halting the transmittal of pulses from oscillator 40 through counter 36 to the digital-to-analog converter 42. Once the counter 36 has been halted, the output of the converter 42 remains constant thereby fixing its output and the output of the photomultiplier tube power supply 26 at the value necessary to hold the gain of the photomultiplier tube 22 so that its output equals the threshold value for the calibrating light signal input. The illustrated optical-measuring system is now calibrated and the photomultiplier tube power supply output remains fixed by the number of pulses stored in counter 36 until the next calibration cycle is commenced.

It will be appreciated that there are a number of variations of the preferred embodiment which will accomplish its stated objectives. For example, the pulse signals generated by the oscillator 40 could be derived from the photomultiplier tube 22 itself. In addition, the flip-flop 34 need not be triggered by the first pulse from the threshold circuit 52 but by, for example, the second or third pulse thereby preventing any stray pulses or noise from prematurely halting the calibration cycle. Thus, while the present invention has been described by means of a specific preferred embodiment, there is no wish to be limited thereto for, as indicated above, obvious modifications will occur to those skilled in the art without departing from the spirit and scope of the invention.

We claim:

1. In an optical system for measuring particles, the system being of the type having a light source, a view volume for receiving particles for measuring, optics for defining and directing a light beam along an axis from said light source through said view volume, photosensitive means for generating a signal output as a function of the portion of the light beam scattered by particles within the view volume, that portion passing through a lens for collecting that portion of said light beam scattered by particles within said view volume and for directing said collected portion of the light beam to said photosensitive means, the improvement for automatically calibrating the system, the improvement comprising:
   a. calibration initiation circuit means for generating a calibration start signal;
   b. threshold circuit means connected to the output of said photosensitive means for generating a threshold pulse signal only when said photosensitive means signal output exceeds a predetermined threshold level;
   c. bistable circuit means connected to said calibration initiation circuit means and said threshold circuit means having a first output state in response to receipt of said calibration start signal and a second output state in response to receipt of at least one threshold pulse signal;
   d. an oscillator for generating a pulse train;
   e. gating means connected to said oscillator and said bistable circuit means for passing said pulse train when said bistable circuit means assumes said first state and for inhibiting the passage of the pulse train when said bistable circuit means assumes said second state;
   f. counter means connected to said calibration initiation circuit means resettable only in response to receipt of said calibration start signal and connected to said gating means for counting the number of pulses passed by said gating means from the oscillator to generate at an output of the counter means an output signal as a function of the number of pulses counted;
   g. a digital-to-analog converter connected to said counter means receiving the generated output signal from the counter means to generate an analog signal as a function of the received signal;
   h. a variable output power supply for said photosensitive means connected thereto and to said digital-to-analog converter, the power supply receiving the analog signal to generate a power supply output varying in response to the magnitude of the received analog signal which initially has a predetermined minimum value which when applied to the photosensitive means through the power supply causes the photosensitive means to initially produce a photosensitive means signal output lower in magnitude than said predetermined threshold level of said threshold circuit means and which analog signal increases in magnitude which when applied to the photosensitive means through the power supply causes the gain of the photosensitive means to increase, thereby eventually producing a photosensitive means signal output which exceeds the predetermined threshold level of the threshold circuit means to cause the threshold circuit to generate the threshold pulse signal to cause the bistable circuit means to assume the second output state;
   i. light-conducting means for conducting a fixed amount of light from said light source to said view volume to pass therethrough to impinge upon the photosensitive means for the photosensitive means to initially produce the photosensitive means signal output lower in magnitude than the threshold level of the threshold circuit means; and
   j. light modulation means connected to said bistable circuit means for modulating the fixed amount of light conducted by light conducting means only when said bistable circuit means assumes said first state as the gain of the photosensitive means increases to eventually produce a photosensitive means signal output which exceeds the predetermined threshold level of the threshold circuit means.

2. The optical-measuring system of claim 1, wherein said calibration initiation circuit means comprises a manually operable switch.

3. The optical-measuring system of claim 1, wherein said calibration initiation circuit means comprises a clock which automatically generates said calibration start signal at predetermined periodic intervals.

4. The optical measuring system of claim 1, wherein:
   a. the light-conducting means comprises first and second fiber optic bundles, said first bundle having one end thereof positioned adjacent said light source and said second bundle having one end thereof positioned adjacent said view volume angularly disposed with respect to the axis of said light beam directed through the view volume; and
   b. said light modulation means comprises a rotatable chopper having a plurality of apertures defined therein, said apertures being aligned with and disposed between the other ends of said first and second fiber optic bundles.

5. The optical measuring system of claim 1, wherein said bistable circuit means assumes said second output state only after the receipt of a predetermined number of said threshold pulse signals.

6. In an optical system for producing an electrical signal as a function of electromagnetic radiation intensity in the optical wavelength having a photodetector whose gain can be varied with voltage and which produces and output signal, an improvement for automatically calibrating the optical system, the improvement comprising:
   calibration initiation circuit means for generating a calibration start signal;
   threshold circuit means connected to the output of the photodetector for generating a threshold pulse signal only when the photodetector output signal exceeds a predetermined threshold level for the threshold circuit means;
   bistable circuit means connected to the calibration initiation circuit means and threshold circuit means having a first output state in response to receipt of the calibration start signal and a second output state in response to receipt of the threshold pulse signal;
   an oscillator for generating a pulse train;
   gating means connected to the oscillator and the bistable circuit means for passing the pulse train when the bistable circuit means assumes the first state and for inhibiting the passage of the pulse train when the bistable circuit means assumes the second state;
   counter means connected to the calibration initiation circuit means and the gating means for counting the number of pulses passed by the gating means from the oscillator to generate at an output of the counter means an output signal as a function of the number of pulses counted, the counter means being resettable only in response to receipt of the calibration start signal; a digital-to-analog converter connected to the counter means receiving the generated output signal from the counter means to generate an analog signal as a function of the received signal which analog signal increases due to continuous passing of the pulse train through the gating means when the bistable circuit means assumes the first state; a variable output power supply for the photodetector connected thereto and to the digital-to-analog converter, the power supply receiving the analog signal to generate a power supply output signal varying in response to the magnitude of the received analog signal which power supply output signal initially has a predetermined minimum value which when applied to the photodetector causes the photodetector to initially produce a photodetector output signal lower in magnitude than the predetermined threshold level of the threshold circuit means and which power supply output signal increases as a function of the increasing analog signal which output signal when applied to the photodetector causes the gain of the photodetector to increase thereby eventually producing a photodetector output signal which exceeds the predetermined threshold level of the threshold circuit means to cause the threshold circuit to generate the threshold pulse signal to cause the bistable circuit means to assume the second output state; and optical electromagnetic radiation conducting means connected to the bistable circuit means for conducting a fixed amount of electromagnetic radiation in the optical wavelength from one electromagnetic radiation source to impinge upon the photodetector when the bistable circuit means assumes a first state for the photodetector to initially produce the photodetector output signal lower in magnitude than the threshold level of the threshold circuit means in automatically calibrating the optical system.

7. In the optical system, as defined in claim 6, having the improvement for automatically calibrating the optical system, further comprising:

optical electromagnetic radiation modulation means connected to the bistable circuit means for modulating the fixed amount of optical electromagnetic radiation conducted by the optical electromagnetic radiation conducting means to the photodetector when the bistable circuit means assumes the first output state as the gain of the photodetector increases to eventually produce an output which exceeds the predetermined threshold level of the threshold circuit means to cause the bistable circuit to respond thereto and assume the second output state.

* * * * *